United States Patent [19]

Murakami

[11] 3,979,974
[45] Sept. 14, 1976

[54] PLANETARY TRANSMISSION
[75] Inventor: Noboru Murakami, Nagoya, Japan
[73] Assignee: Aisin Seiki Kabushiki Kaisha, Kariya, Japan
[22] Filed: July 21, 1975
[21] Appl. No.: 597,779

Related U.S. Application Data
[63] Continuation of Ser. No. 420,842, Dec. 3, 1973, abandoned.

[30] Foreign Application Priority Data
Dec. 27, 1972  Japan.................................. 48-2883
Dec. 27, 1972  Japan.................................. 48-2884

[52] U.S. Cl. ................................................. 74/759
[51] Int. Cl.² ........................................ B60K 41/18
[58] Field of Search ............. 74/759, 760, 761, 758

[56] References Cited
UNITED STATES PATENTS
822,453   6/1906   Hollopeter ............................ 74/761
3,592,082  7/1971   Ott ........................................ 74/761
3,611,835  10/1971  Borman ................................. 74/759
3,730,022  5/1973   O'Malley ............................... 74/759

*Primary Examiner*—Samuel Scott
*Assistant Examiner*—Lance W. Chandler
*Attorney, Agent, or Firm*—Pierce, Scheffler & Parker

[57] ABSTRACT

A planetary transmission comprising at least three planetary gear sets which are selectively connectable between an input shaft and an output shaft, and at least five friction elements such as clutches and brakes which are selectively actuated to selectively engage the rotational members of the three planetary gear sets, thereby providing at least five speed ratios between the input and output shafts.

2 Claims, 2 Drawing Figures

PLANETARY TRANSMISSION

This is a continuation, of application Ser. No. 420,842 filed Dec. 3, 1973, now abandoned.

BACKGROUND OF THE INVENTION

This invention relates to planetary transmissions and more particularly to planetary transmissions for vehicles providing a plurality of speed ratios between an input shaft and an output shaft.

Conventionally, various planetary transmissions have been proposed which have been used with the combination of a torque converter or a fluid coupling. In such transmissions for particularly large-sized vehicles such as trucks or buses, it is desirable to provide at least four speed ratios. For this purpose, it is considered to have more speed ratios than four ratios by combining at least three sets of the single or double pinion planetary gears and selectively engaging their elements of the planetary gear sets. In combining, it is desirable to satisfy the following conditions:

1. Compared with other members the input member for transmitting the input torque is subjected to the smallest torque and is, therefore, constituted of a sun gear of small diameter.

2. The output member is adapted for transmitting the torque corresponding to the product of the input torque and the gear ratio and is, thus, constituted of a considerably large-diametered ring gear or carrier.

3. The fixed or reaction member is adapted for transmitting the torque corresponding to the product of the input torque and (output torque/input torque 1:1) thus the fixed member for a low forward speed ratio or a reverse speed ratio is constituted of the ring gear or carrier.

SUMMARY OF THE INVENTION

Therefore, it is an object of the present invention to provide an improved planetary transmission satisfying the above-mentioned conditions.

Another object of the present invention is to provide an improved planetary transmission having at least five speed ratios.

Another object of the present invention is to provide an improved planetary transmission comprising two sets of single pinion planetary gears and at least a set of double pinion planetary gear.

Another object of the present invention is to provide an improved planetary transmission wherein the sun gears are arranged as input members, carriers are arranged as output members and ring gears or sun gears are arranged as reaction members.

Another object of the present invention is to provide an improved planetary transmission which is simple in construction.

BRIEF DESCRIPTION OF THE DRAWING

Various other objects, features and attendant advantages of the present invention will be more fully appreciated as the same becomes better understood from the following detailed description when considered in connection with the accompanying drawing wherein.

DETAILED DESCRIPTION OF THE PREFERRED EMBODIMENTS

Figure 1:
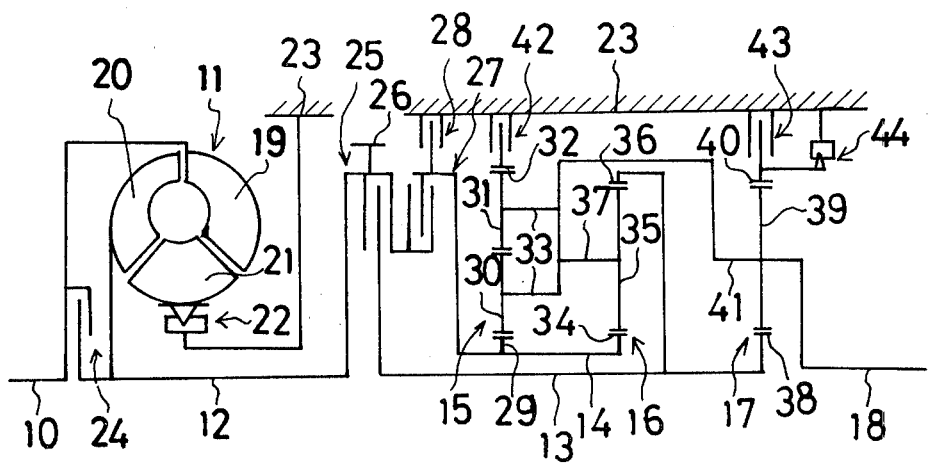
FIG. 1 is a diagrammatic view of the planetary transmission.

Referring to FIG. 1, the planetary transmission comprises in general an input shaft 10 operatively connected to an engine, not shown, a torque converter 11, first, second and third intermediate shafts 12, 13 and 14, first, second and third planetary gear sets or units 15, 16 and 17, and an output or driven shaft 18. The torque converter 11 is of a conventional type and operates in a conventional manner. The torque converter 11 includes a pump or impeller element 19 connected to the input shaft 10, a turbine element 20 connected to the first intermediate shaft 12 and a stator element 21 supported by a stationary part of a transmission case 23 through a oneway brake 22. A first clutch 24 is positioned between the input shaft 10 and the first intermediate shaft 12 for completing a direct connection therebetween so that the operation of the torque converter 11 will be stopped upon engaging of the clutch 24.

The first intermediate shaft 12 is connected to second and third clutches 25 and 27, the second clutch 25 being connected to the second intermediate shaft 13 and the third clutch 27 being connected to the third intermediate shaft 14. The third intermediate shaft 14 is also connected to a brake 28. These intermediate shafts 12, 13 and 14 are arranged concentrically to one another. A gear 26 secured to a clutch drum of the clutch 25 acts as a power take-off unit, not shown.

The first planetary gear set 15 is of a double pinion type and has a sun gear 29 connected to the third intermediate shaft 14 and meshed with a plurality of pinions 30. The pinions 30 are meshed with a plurality of pinions 31, respectively, which are, in turn, meshed with a ring gear 32. These pinions 30 and 31 are rotatably mounted on a carrier or output member 33. The ring gear 32 is connected to a brake 42, thus providing a reaction member when the brake 42 is engaged.

The second planetary gear set 16 of a single pinion type comprises a sun gear 34 connected to the shaft 14, a plurality of pinions 35 meshed with the sun gear 34, a ring gear 36 meshed with the pinions 35 and a carrier or output member 37 which rotatably supports the pinions 35. The ring gear 36 is also connected to the shaft 13. The carriers 37 is connected to the carrier 33.

As will be clear hereinbefore, the sun gears 29 and 34 are selectively associated, through the shaft 14, with the shaft 12 and the stationary part 23 depending on the operations of the clutch 27 and the brake 28, thereby selectively providing either input or reaction members for the planetary gear sets 15 and 16.

The third planetary gear set 17 is of a single pinion type. The planetary gear set 17 has a sun gear or input member 38 connected to the shaft 13 and meshing with a plurality of pinions 39. The pinions 39 mesh with a ring gear or reaction member 40 and are rotatably mounted on a carrier or output member 41.

A brake 43 and a one-way brake 44 are provided and arranged in parallel between the case 23 and the ring gear 40. Therefore, the ring gear 40 will be held stationary from rotation in either direction when the brake 43 is engaged. While only the one-way brake 44 is engaged, the ring gear 40 will be held stationary from rotation only in one direction but will be free in the other direction. All carriers 33, 37 and 41 are connected to one another, and are thus connected to the output shaft 18. Accordingly, all carriers 33, 37 and 41 are arranged concentrically with the shaft 13 and are adapted to rotate with the output shaft 18 arranged behind the shaft 13.

In operation, a neutral speed ratio is obtained when the all clutches and brakes are disengaged, thus interrupting the drive between input and output shafts.

The first or low forward speed ratio is established by the engagements of the clutch 25 and the brake 43. Since the ring gear 40 is now stationary by the engagement of the brake 43, the ring gear 40 acts as a stationary reaction member for the planetary gear set 17. The carrier 41 is thus driven in the same direction as the sun gear 38, but at a speed less than the sun gear 38 through the pinions 39. The power is thus transmitted from the input shaft 10 to the output shaft 18 through the torque convertor 11, shaft 12, clutch 25, shaft 13, sun gear 38, pinions 39 and carrier 41. The low speed ratio depends on the gear ratio of gears 38 and 40.

The first forward speed ratio may also be established by the engagements of the clutch 25 and the one-way brake 44. This will attain the substantial same operation as the engagement of the brake 43. But, because the one-way brake 44 prevents rotation of the ring gear 40 into only one direction, the engine brake will not be obtained.

The second forward speed ratio is established by the engagements of the clutch 25 and the brake 42. The input power is transmitted to the shaft 13, as in the low speed ratio, and is thereafter transmitted to the output shaft 18 through two paths. One path is from the ring gear 36 through pinions 35 and carriers 37 and 41 to output shaft 18, and the other path is from ring gear 36 through pinions 35, sun gear 34, shaft 14, sun gear 29, pinions 30 and 31 and carriers 33 and 36 to the output shaft 18. Now, the ring gear 32 is held stationary by the brake 42, thereby providing a reaction member. All carriers 33, 37 and 41 are driven in the same direction as ring gear 36 at a speed less than ring gear 36 under the action of pinions. Therefore, the second speed ratio depends on the gear ratios of gears 36 and 34 and of the gears 29 and 32, resulting in a speed ratio smaller than low speed ratio.

The third forward speed ratio is established by the engagements of the clutch 25 and the brake 28. The input power is transmitted to the shaft 13, as in the low speed ratio, and is then transmitted to the output shaft 18 through ring gear 36, pinions 35 and carriers 37 and 41. The sun gear 34 is held stationary by the brake 28 and now acts as a reaction member. Thus, carriers 37 and 41 are driven in the same direction as the ring gear 36 at a speed less than the ring gear 36 under the action of the pinions 35. The third speed ratio depends on the gear ratio of gears 36 and 34, thus providing a speed ratio smaller than the second speed ratio.

The fourth or high forward speed ratio is established by the engagements of the clutches 25 and 27. The input power, which is transmitted to the shaft 12 through the torque converter 11, is transmitted to the output shaft 18 through two paths. One path is from the shaft 12 to the shaft 18 through the shaft 13, ring gear 36, pinions 35, carriers 37 and 41, and the other path is from the shaft 12 to the shaft 18 through the shaft 14, sun gear 34, pinions 35 and carriers 37 and 41. The sun gear 34 and ring gear 36 are rotated at the same speed by the shaft 12 thereby providing input members. This results in the same rotations of the pinions 35, and carriers 37 and 41 must also rotate at the same speed as the sun gear 34 and the ring gear 36. Thus the output shaft 18 must rotate at the same speed and, therefore, the high speed ratio from the input shaft 10 to the output shaft 18 is one to one.

The low reverse speed ratio is established by the engagements of the clutch 27 and the brake 43.

The input power from the shaft 12 is transmitted to the shaft 14 through the clutch 27, and is then transmitted to the output shaft 18 through two paths. One path is from the shaft 14 through sun gear 34, pinions 35, ring gear 36, sun gear 38 and the carrier 41 to the output shaft 18, and the other path is from the shaft 14 through sun gear 34, pinions 35 and carriers 37 and 41. The ring gear 40 is held stationary by the brake 43 and acts as a reaction member. Namely, the ring gear 36 and the sun gear 38 are rotated in direction opposite to the sun gear 34 under the action of pinions 35 and at speed less than the sun gear 34. The rotation of carrier 41 is in the same direction as the sun gear 38 under action of pinions 39 and at a speed less than the sun gear 38. Thus the output shaft 18 is rotated in a direction opposite to the input shaft 10 and at a speed less than the input shaft 10. The low reverse speed ratio depends on the gear ratios of sun gear 38 and ring gear 40 and of sun gear 34 and ring gear 36.

The high reverse speed ratio is established by the engagements of the clutch 27 and the brake 42. The input power is transmitted to the shaft 14, as in the low reverse speed ratio, and is then transmitted to the output shaft 18 through sun gear 29, pinions 30 and 31 and carriers 33 and 41. Now the ring gear 32 is held stationary by the brake 42 thus providing a reaction member. The carrier 33 is rotated in a direction opposite to the sun gear 29 under the action of pinions so and 31 and at a speed less than the sun gear 29. Thus the high reverse speed ratio depends on the gear ratio of sun gear 29 and ring gear 32.

The shifting operation of the above-mentioned planetary transmission is summarized in the following Table 1 with reference to the operations of the clutches 25 and 27 and of the brakes 28, 42 and 43. In Table 1, the figures corresponds to the reference numeral given to the clutches and brakes in FIG. 1. The mark O indicates the operation of the clutch or brake and the mark ◌ indicates that the one-way brake 44 may be either of operation and inoperation thereof. The gear ratio represents the gear ratio of the output shaft to the input shaft wherein Z indicates the number of gear and the figures attached to Z correspond to the reference numeral given to the respective gears in FIG. 1.

TABLE I

| | Speed Ratio | 25 | 27 | 28 | 42 | 43 | 44 | Gear Ratio |
|---|---|---|---|---|---|---|---|---|
| Forward | Low Ratio | O O | | | | O | ◌ | $1:1 + \dfrac{Z\,40}{Z\,38}$ |
| | Second Ratio | O | | | O | | | $1:1 + \dfrac{Z\,32}{Z\,29} \cdot \dfrac{Z\,34}{Z\,36}$ |
| | Third Ratio | O | | O | | | | $1:1 + \dfrac{Z\,34}{Z\,36}$ |

TABLE I-continued

| Speed Ratio | 25 | 27 | 28 | 42 | 43 | 44 | Gear Ratio |
|---|---|---|---|---|---|---|---|
| High Ratio | O | O | | | | | 1:1.0 |
| Reverse Low Ratio | | | O | | O | | $1:-(\frac{Z\,36}{Z\,34} \cdot \frac{Z\,40}{Z\,38} - 1)$ |
| Reverse High Ratio | | | O | | | O | $1:-(\frac{Z\,32}{Z\,29} - 1)$ |

Assuming that Z29 is 24, Z32 is 75, Z34 is 24, Z36 is 60, Z38 is 24 and Z40 is 60, the respective speed ratios of the above-mentioned transmission are as follows:

In forward, $$\text{Low Ratio} = 1:1 + \frac{Z\,40}{Z\,38} = 1:3.5$$

$$\text{Second Ratio} = 1:1 + \frac{Z\,32}{Z\,29} \cdot \frac{Z\,34}{Z\,36} = 1:2.25$$

$$\text{Third Ratio} = 1:1 + \frac{Z\,34}{Z\,36} = 1:1.4$$

$$\text{High Ratio} = 1:1.0$$

In Reverse, $$\text{Low Ratio} = 1:-(\frac{Z\,36}{Z\,34} \cdot \frac{Z\,40}{Z\,38} - 1) = 1:-5.25$$

$$\text{High Ratio} = 1:-(\frac{Z\,32}{Z\,29} - 1) = 1:-2.125$$

As will be clear hereinbefore, the planetary transmission has four forward speed ratios and two reverse speed ratios. However, it will be obvious to arrange and design the transmission with four forward speed ratios and a reverse speed ratio or three forward speed ratios and two reverse speed ratios if within six speed ratios.

Figure 2:
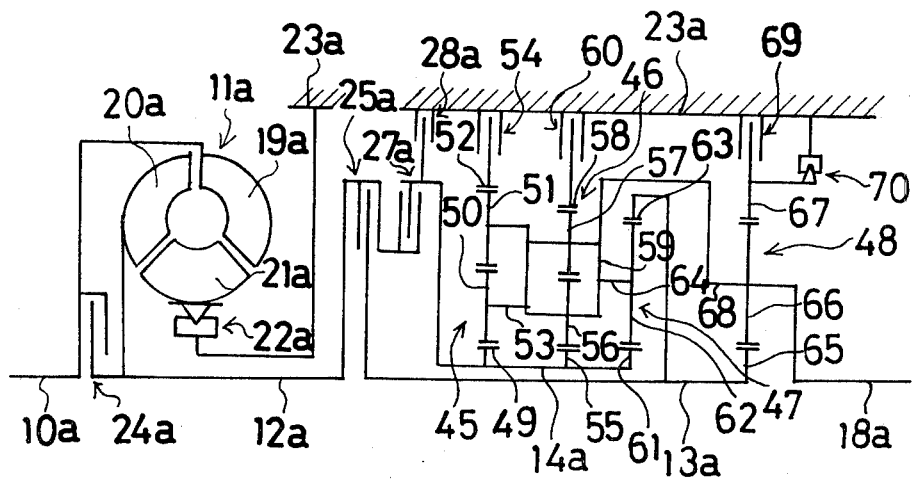
FIG. 2 is a view similar to FIG. 1 showing a modification.

Another embodiment of the present invention will be now explained referring to FIG. 2 wherein like elements are shown by like reference numerals with affix a. The planetary transmission has four sets of planetary gears 45, 46, 47 and 48. The first planetary gear set 45 is of a double pinion planetary gear and has a sun gear 49 connected to the shaft 14a, pinions 50 connected to the sun gear 49, pinions 51 connected to the pinions 50, a ring gear 52 connected to the pinions 51 and a carrier 53 which rotatably supports the pinions 50 and 51. The ring gear 52 is held stationary by a brake 54 thus providing a reaction member.

The second planetary gear set 46 is also of a double pinion planetary gear. The second planetary gear set 46 has a sun gear 55, pinions 56 and 57, a ring gear 58 and a carrier 59, these elements being connected to one another in a substantial same manner as the first planetary gear set 45, as shown in FIG. 2. The ring gear 58, held stationary by a brake 60, acts as a reaction member.

The third planetary gear set 47 is of a single pinion planetary gear and includes a sun gear 61 connected to the shaft 14a, pinions 62 connected to the sun gear 61, a ring gear 63 connected to the pinions 61 and also connected to the shaft 13a and a carrier which rotatably supports pinions 62.

The fourth planetary gear set 48 is of a single pinion planetary gear and has a sun gear 65 connected to the shaft 13a, pinions 66 meshed with a ring gear 67 and rotatably mounted in a carrier 68. The ring gear 67 is connected to the case 23a through a brake 69 and a one-way brake 70 in a substantial same manner as the ring gear 40 of the first embodiment.

As will be clear hereinbefore, the planetary transmission comprises two sets of double planetary pinion gears and two sets of single planetary pinion gears, thereby providing five forward speed ratios and three reverse speed ratios.

In the low or first forward speed ratio, the clutch 25a and the brake 69 will be engaged. Thus the power is transmitted from the input shaft 10a through the torque converter 11a, shaft 12a and clutch 25a to the shaft 13a, and is then transmitted to the output shaft 18a through the sun gear 65, pinions 66 and carrier 68 in which the ring gear 67 is now a reaction member. The carrier 68 is rotated in the same direction as the sun gear 65 due to the planetary action of pinions 66. The low speed ratio depends on the gear ratio of gears 65 and 67.

The first forward speed ratio may be established by the engagements of the clutch 25a and the one-way brake 70, or by the engagements of the clutch 25a, brake 69 and one-way brake 70, as will be clear from the above-mentioned embodiment.

In the second forward speed ratio, the clutch 25a and the brake 54 will be engaged. Accordingly, the ring gear 52, held stationary by the brake 54, is a reaction member. The input power transmitted to the shaft 13a as in the first forward speed ratio is transmitted to the output shaft 18a through two paths. One path is formed by ring gear 63, pinions 62 and carriers 64 and 68 and the other path is formed by ring gear 63, pinions 62, sun gear 61, shaft 14a, sun gear 49, pinions 50 and 51 and carriers 53 and 68. The carrier 37 is driven in the same direction as ring gear 63 due to the action of pinions 62, and the carrier 53 is driven in the same direction as ring gear 63 due to the actions of pinions 50 and 51 through sun gear 61, shaft 14a and sun gear 49. Thus, the second forward speed ratio depends on the gear ratios of the gears 61 and 63 and of gears 49 and 52. In the third forward speed ratio, the clutch 25a and the brake 60 will be engaged. Because the ring gear 58 which is held stationary by the brake 60 acts as a reaction member, the input power is transmitted from the shaft 13a to the output shaft 18a through two paths. One path is from ring gear 63 to the output shaft 18a through pinions 62 and carriers 64 and 68 wherein carrier 64 is driven in the same direction as the ring gear 63 under the action of pinions 62. The other path is from the ring gear 63 to the output shaft 18a through pinions 62, sun gear 56, pinions 56 and 57 and carriers 59 and 68 in which carrier 59 is driven in the same direction as ring gear 63 under the actions of pinions 56 and 57. The third forward speed ratio depends on the gear ratios of gears 61 and 63 and of gears 55 and 58.

In the fourth forward speed ratio, the clutch 25a and the brake 28a will be engaged. The input power is now transmitted from the shaft 13a to the output shaft 18a through ring gear 63, pinions 62 and carriers 64 and 68 because the sun gear 61 acts as a reaction member. The carrier 64 is driven in the same direction as ring gear due to the action of pinions 62. Thus the fourth forward speed ratio depends on the gear ratio of gears 61 and 63.

In the high or fifth forward speed ratio, the clutches 25a and 27a will be engaged. Therefore, the part of the input power transmitted to the shaft 12a is transmitted to the pinions 62 through clutch 25a, shaft 13a and ring gear 63, and the remaining is transmitted to the pinions 62 through clutch 27a, shaft 14a and sun gear 61. The input power combined at pinions 62 is then transmitted through carriers 64 and 68 to the output shaft 18a. As will be clear from the above-mentioned embodiment, all elements must rotate in the same direction and at the same speed. The high forward speed ratio from the input shaft 10a to the output shaft 18a is one to one.

In the low or first reverse speed ratio, the clutch 27a and the brake 69 will be engaged. The ring gear 67 is held stationary by the brake 69 thus providing a reaction member. Thus, the input power is transmitted to the shaft 14a through input shaft 10a, torque converter 11a, shaft 12a and clutch 27a, and is then transmitted to the output shaft 18a through two paths. One path is formed by sun gear 61, pinions 62, ring gear 63, shaft 13a, sun gear 65, pinions 66 and carrier 68, and the other path is formed by sun gear 61, pinions 62 and carriers 64 and 68. The output shaft 18a is now rotated in a direction opposite to the input shaft 10a in the substantial same manner as in the low reverse speed ratio of the above-mentioned embodiment. Thus, the low reverse speed ratio depends on the gear ratios of gears 61 and 63 and of gears 65 and 67.

In the second reverse speed ratio, the clutch 27a and the brake 54 will be engaged. The input power is transmitted from the shaft 14a to the output shaft 18a through sun gear 49, pinions 50 and 51 and carriers 59 and 68 wherein the ring gear 52 is a reaction member. Therefore, the rotation of the output shaft 18a is reversed in the substantial same manner as in the high reverse speed ratio of the above-mentioned embodiment. The second reverse speed ratio depends on the gear ratio of gears 49 and 52.

In the high or third reverse speed ratio, the clutch 27a and the brake 60 will be engaged. The input power is now transmitted from the shaft 14a to the output shaft 18a through sun gear 55, pinions 56 and 57 and carriers 59 and 68. The ring gear 58 is now a reaction member. The rotation of the output shaft 18a is reversed in the substantial same manner as in the high reverse speed ratio of the above-mentioned embodiment.

The shifting operation of the planetary transmission in FIG. 2 is summarized in the following Table II which is shown in the same manner as in Table I.

TABLE II

|  | Speed Ratio | 25a | 27a | 28a | 54 | 60 | 69 | 70 | Gear Ratio |
|---|---|---|---|---|---|---|---|---|---|
| Forward | Low Ratio | O O |  |  |  |  | O | O | $1:1 + \frac{Z\,67}{Z\,65}$ |
|  | Second Ratio | O |  |  | O |  |  |  | $1:1 + \frac{Z\,52}{Z\,49} \cdot \frac{Z\,61}{Z\,63}$ |
|  | Third Ratio | O |  |  |  | O |  |  | $1:1 + \frac{Z\,61}{Z\,63} \cdot \frac{Z\,58}{Z\,55}$ |
|  | Fourth Ratio | O |  | O |  |  |  |  | $1:1 + \frac{Z\,61}{Z\,63}$ |
|  | High Ratio | O | O |  |  |  |  |  | $1:1.0$ |
| Reverse | Low Ratio |  | O |  |  |  | O |  | $1:-(\frac{Z\,63}{Z\,61} \cdot \frac{Z\,67}{Z\,65} - 1)$ |
|  | Second Ratio |  | O |  | O |  |  |  | $1:-(\frac{Z\,52}{Z\,49} - 1)$ |
|  | High Ratio |  | O |  |  | O |  |  | $1:-(\frac{Z\,58}{Z\,55} - 1)$ |

Now assuming that Z49 is 24, Z52 is 90, Z55 is 30, Z58 is 66, Z61 is 30, Z63 is 60, Z65 is 24 and Z67 is 84, the respective speed ratios of the transmission are as follows:

In forward,

Low Ratio $= 1:1 + \frac{Z\,67}{Z\,65} = 1:4.5$

Second Ratio $= 1:1 + \frac{Z\,52}{Z\,49} \cdot \frac{Z\,61}{Z\,63} = 1:2.875$

Third Ratio $= 1:1 + \frac{Z\,58}{Z\,55} \cdot \frac{Z\,61}{Z\,63} = 1:2.1$

Fourth Ratio $= 1:1 + \frac{Z\,61}{Z\,63} = 1:1.5$

High Ratio $= 1:1.0$

In Reverse,

Low Ratio $= 1:-(\frac{Z\,63}{Z\,61} \cdot \frac{Z\,67}{Z\,65} - 1) = 1:-7.0$

Second Ratio $= 1:-(\frac{Z\,52}{Z\,49} - 1) = 1:-2.75$

High Ratio $= 1:-(\frac{Z\,58}{Z\,55} - 1) = 1:-1.2$

From the last-mentioned embodiment, it will be obvious to provide the transmission with five forward speed ratios and a reverse speed ratio or four forward speed ratios and two reverse speed ratios if within eight speed ratios.

Assuming that the brake 60 is omitted from the system illustrated in FIG. 2, the transmission system provides four forward speed ratios and two reverse speed ratios. In this case, the shifting operation of the planetary transmission will be clear from the following Table III.

TABLE III

| | Speed Ratio | 25a | 27a | 28a | 54 | 69 | 70 | Gear Ratio |
|---|---|---|---|---|---|---|---|---|
| Forward | Low Ratio | O | | | | | O | 1 : 4.50 |
| | | O | | | | o | O | |
| | Second Ratio | O | | | O | | | 1 : 2.875 |
| | Third Ratio | O | | O | | | | 1 : 1.50 |
| | High Ratio | O | O | | | | | 1 : 1.0 |
| Reverse | Low Ratio | | | | O | O | | 1 : –7.00 |
| | High Ratio | | | | O | O | | 1 : –2.75 |

The power path of each speed ratio will be obviously understood.

If the brake 54 is omitted from the system of FIG. 2, the shifting operation of the planetary transmission will be as shown in the following Table IV.

TABLE IV

| | Speed Ratio | 25a | 27a | 28a | 60 | 69 | 70 | Gear Ratio |
|---|---|---|---|---|---|---|---|---|
| Forward | Low Ratio | O | | | | | O | 1 : 4.50 |
| | Second Ratio | O | | | O | | O | 1 : 2.10 |
| | Third Ratio | O | | O | | | | 1 : 1.50 |
| | High Ratio | O | O | | | | | 1 : 1.0 |
| Reverse | Low Ratio | | | | O | O | | 1 : –7.0 |
| | High Ratio | | | | O | O | | 1 : –1.20 |

If the brake 28a is omitted from the system illustrated in FIG. 2, the planetary transmission operates as shown in the following Table V.

TABLE V

| | Speed Ratio | 25a | 27a | 54 | 60 | 69 | 70 | Gear Ratio |
|---|---|---|---|---|---|---|---|---|
| Forward | Low Ratio | O | | | | | O | 1 : 4.50 |
| | Second Ratio | O | | O | | | | 1 : 2.875 |
| | Third Ratio | O | | | O | | | 1 : 2.10 |
| | High Ratio | O | O | | | | | 1 : 1.0 |
| Reverse | Low Ratio | | | | O | O | | 1 : –7.0 |
| | Second Ratio | | | O | O | | | 1 : –2.75 |
| | High Ratio | | | O | | O | | 1 : –1.20 |

Various other modifications and variations of the present invention are obviously possible in light of the above teachings. It is to be understood, therefore, that within the scope of the appended claims, the invention may be practiced otherwise than as specifically described herein.

What is claimed as new and desired to be secured by Letters Patent of the United States is:

1. In a planetary transmission having an input shaft and an output shaft, said transmission comprising:
   a first intermediate shaft connected to said input shaft,
   a second intermediate shaft,
   a third intermediate shaft,
   a first planetary gear set including a first sun gear rigidly connected to said third intermediate shaft, first pinions meshed with said first sun gear, second pinions meshed with said first pinions, a ring gear meshed with said second pinions, and a first carrier supporting said first and second pinions,
   a second planetary gear set including a second sun gear rigidly connected to said third intermediate shaft, third pinions meshed with said second sun gear, a second ring gear meshed with said third pinions, and a second carrier carrying said third pinions and connected to said first carrier;
   a third planetary gear set including a third sun gear secured to said second intermediate shaft and connected to said second ring gear, fourth pinions meshed with said third sun gear, a third ring gear meshed with said fourth pinions, and a third carrier carrying said fourth pinions and connected to said first and second carriers,
   a fourth planetary gear set including a fourth sun gear secured to said third intermediate shaft, fifth pinions meshed with said fourth sun gear, sixth pinions meshed with said fifth pinions, a fourth ring gear meshed to said fifth pinions, and a fourth carrier carrying said fifth and sixth pinions, said fourth carrier being connected to said output shaft,
   a first clutch positioned between said first and second intermediate shafts and for engaging therebetween during operation of first, second, third and fourth forward speeds;
   a second clutch positioned between said first and third intermediate shafts and for engaging therebetween during operation of fourth forward and reverse speeds,
   a first brake for anchoring said third intermediate shaft during operation of third forward speed;

a second brake for anchoring said ring gear of said first planetary gear set during operation of second forward speed;

a third brake for anchoring said ring gear of said third planetary gear set during operation of first forward and reverse speeds, and a fourth brake for anchoring said ring gear of said fourth planetary gear set.

2. A planetary transmission as set forth in claim 1, further comprising a one-way brake engageable with said third ring gear.

* * * * *